(12) United States Patent
Post

(10) Patent No.: US 7,209,168 B2
(45) Date of Patent: Apr. 24, 2007

(54) DEFECTIVE PIXEL CORRECTION METHOD AND SYSTEM

(75) Inventor: William L. Post, McMinnville, OR (US)

(73) Assignee: Micron Technology, Inc., Boise, ID (US)

( * ) Notice: Subject to any disclaimer, the term of this patent is extended or adjusted under 35 U.S.C. 154(b) by 797 days.

(21) Appl. No.: 09/834,061

(22) Filed: Apr. 11, 2001

(65) Prior Publication Data

US 2002/0149683 A1    Oct. 17, 2002

(51) Int. Cl.
*H04N 9/64* (2006.01)
(52) U.S. Cl. .................................. 348/246; 348/247
(58) Field of Classification Search ................ 348/246, 348/247
See application file for complete search history.

(56) References Cited

U.S. PATENT DOCUMENTS

| | | | |
|---|---|---|---|
| 4,237,488 A | | 12/1980 | Takemura |
| 5,291,293 A | * | 3/1994 | Kapan .......................... 348/246 |
| 5,381,175 A | | 1/1995 | Sudo et al. |
| 5,500,521 A | * | 3/1996 | Suzuki ..................... 250/208.1 |
| 5,796,430 A | * | 8/1998 | Katoh et al. ................. 348/246 |
| 5,929,865 A | * | 7/1999 | Balz et al. ................... 345/441 |
| 6,002,433 A | * | 12/1999 | Watanabe et al. ............ 348/246 |
| 6,642,961 B1 | * | 11/2003 | Hsieh .......................... 348/247 |
| 6,665,009 B1 | * | 12/2003 | Dong ........................... 348/246 |
| 7,006,136 B1 | * | 2/2006 | Hsieh ........................... 348/247 |
| 7,034,872 B1 | * | 4/2006 | Yamamoto .................. 348/246 |
| 2001/0038416 A1 | | 11/2001 | Koren et al. |

OTHER PUBLICATIONS

Motorola Semiconductor Technical Data for the SCM20014, Motorola, Inc., Sep. 2000.
European Patent Application 02 001 705.9 first office action dated Sep. 29, 2006.

* cited by examiner

*Primary Examiner*—Vivek Srivastava
*Assistant Examiner*—Yogesh K. Aggarwal
(74) *Attorney, Agent, or Firm*—RatnerPrestia

(57) ABSTRACT

A defective pixel detection and correction mechanism for use in an image sensor integrated circuit determines whether a current pixel is a defective pixel in a consistent manner from frame to frame. The defective pixel detection and correction mechanism also replaces defective pixels with stable replacement values. The defective pixel detection and correction mechanism has a defective pixel detection mechanism that employs a look-up table with defective pixel locations for providing a non-varying determination of whether a pixel is defective or non-defective. The defective pixel detection and correction mechanism also has a defective pixel correction mechanism that employs a consistent replacement choice facility to provide a previous pixel value in the same frame, on the same row, and a predetermined number of pixels from the current pixel location as a replacement value and a replacement unit (e.g., multiplexer) for replacing the defective pixel value with the replacement value.

19 Claims, 5 Drawing Sheets

DEFECTIVE PIXEL CORRECTION METHOD AND SYSTEM

FIELD OF THE INVENTION

The present invention relates generally to image sensors, and more particularly, to a defective pixel correction method and system for image sensors.

BACKGROUND OF THE INVENTION

Recent years have seen a proliferation of digital cameras, such as digital still cameras and digital video cameras. There are many consumer applications that require digital image capture. These applications can include, for example, still motion imaging, full motion imaging, security and surveillance applications, and video-conference applications. An important component in digital still cameras and digital video cameras is the image sensor integrated circuit. Image sensor integrated circuits employ an array of pixels (e.g., a 640×480 pixel array) for detecting photons of light and for converting the photons into an electrical signal (e.g. voltage).

Most image sensor integrated circuits are manufactured by utilizing a complimentary metal oxide semiconductor (CMOS) process. Unfortunately, as with any manufacturing process, image sensor parts have defective pixels. Customers of these parts do not wish to have any obvious defective pixels.

One approach to address defective pixels is to establish strict blemish specifications. For example, vendors of image sensor integrated circuits establish blemish specifications that prevent the shipment of sensors with more than a predetermined number of defects, with defects in certain locations, or with certain types of defects. Unfortunately, the blemish specifications result in lower yields and lower volumes for the manufacturer of the image sensors and higher costs for the customers.

A second approach to address the defective pixel problem is to use some type of defective pixel correction scheme. There are some CCD image sensors that have built-in hardware for use in correcting defective pixels. Unfortunately, these implementations require complex hardware components that occupy a large physical space, thereby making the scheme expensive to implement. Accordingly, these expensive and cumbersome solutions are relegated to only a few applications (e.g., high-end and low-volume applications).

Another hardware approach is described in a semiconductor technical data entitled, "Digital Image Sensor—SCM20014," available from Motorola, Inc. Motorola's digital image sensor decides that pixels are defective independently from frame to frame and then corrects the defective pixels by replacing them with a varying value derived from neighboring pixels for that particular frame. Unfortunately, as described in greater detail hereinafter, this approach utilizes a detection and correction technique that can vary from frame to frame, thereby leading to undesirable image artifacts.

Moreover, some have proposed the use of software-based defective pixel correction techniques. Unfortunately, these prior art approaches require a processor with sufficient processing power to execute the software algorithms that perform the defective pixel correction. As can be appreciated, these software techniques are not available to products that do not have a processor. Furthermore, even for those products that have a processor, the software techniques consume large amounts of processor bandwidth, which may not be acceptable to other components that also require the processor bandwidth. As can be appreciated, the requirement of these software-based techniques for a processor increases the cost of such a product so that such an approach is also relegated to high-end image capture devices.

Some have proposed the use of a personal computer (PC) that can be coupled to a digital capture device (e.g., a digital camera) to execute the correction techniques. In such an approach, the digital capture device first sends the image with the defective pixels to the PC, and then the PC executes the defective pixel correction schemes to correct the image. An advantage of this approach is that the hardware required in the digital capture device can be simplified since the processing power of the PC is harnessed for executing the defective pixel correction software. Unfortunately, most PC connectable capture devices perform data compression on the image in order to transfer the data to the PC through a link (e.g., a USB cable). When compression is applied to the image, there is a high likelihood that the defects spread out and the appearance of the image becomes worse, making correction at the PC more difficult. Consequently, it is desirable to perform defective pixel correction in the sensor IC.

Furthermore, these prior art approaches provide 1) inconsistent defective pixel detection, and 2) inconsistent defective pixel correction, thereby causing undesirable artifacts in the resulting image.

One disadvantage of these prior art approaches is that the defective pixel detection may determine that a particular pixel is defective in one frame and not defective in another frame (hereinafter referred to as inconsistent defective pixel detection). As can be appreciated, inconsistent defective pixel detection provides inconsistent results from frame to frame, thereby leading to a loss of resolution at a pixel location. For example, in a first frame a particular pixel may be determined to be a defective pixel that is replaced with another value. In another frame, the same pixel may be determined to be a non-defective pixel that retains its pixel value. When this approach is applied in a digital video capture device, the inconsistent detection can cause artifacts in the resulting video, such as a blinking spot. Similarly, when the approach is applied in a digital still camera, the inconsistent detection can cause artifacts (e.g., a bright spot or spots) in the resulting image. Consequently, it would be desirable for there to be a defection pixel correction mechanism that consistently detects defective pixels from frame to frame.

Another disadvantage of this approach is that the defective pixel correction may replace the defective pixel value with different replacement choices from frame to frame (hereinafter referred to as inconsistent defective pixel correction). For example, in a first frame a pixel that is determined to be defective is replaced with a first value. In a second frame the same pixel that is defective may be replaced with a second value. In a digital still image, inconsistent replacement values for adjacent pixels may not be critical. However, for digital video, an inconsistent replacement value from frame to frame is very noticeable to the human eye. For example, a replacement value that varies for a defective pixel from frame to frame may appear to the human eye as a blinking spot in the video.

Based on the foregoing, there remains a need for a defective pixel correction method and system for image sensors that overcomes the disadvantages set forth previously.

SUMMARY OF THE INVENTION

According to one embodiment of the present invention, a defective pixel detection and correction mechanism for use in an image sensor integrated circuit is provided. The defective pixel detection and correction mechanism determines whether a current pixel is a defective pixel in a consistent manner from frame to frame. The defective pixel detection and correction mechanism also replaces defective pixels with consistent replacement choices.

In one embodiment, the defective pixel detection and correction mechanism has a defective pixel detection mechanism that employs a look-up table with defective pixel locations for providing a non-varying determination of whether a pixel is defective or non-defective. The defective pixel detection and correction mechanism also has a defective pixel correction mechanism that employs a consistent replacement choice facility to provide a previous pixel value in the same frame, on the same row, and a predetermined number of pixels from the current pixel location as a replacement pixel value. A replacement unit (e.g., multiplexer) is provided for replacing the defective pixel value with the replacement value.

According to another embodiment of the present invention, a defective pixel detection and correction method for use in correcting defective pixels in an image sensor integrated circuit is provided. First, a current pixel location is received. Second, a defective pixel location is received. Next, a determination is made whether the current pixel location is a defective pixel location. When the current pixel location is not a defective pixel location, providing a received pixel value (e.g., a value received from the analog to digital converter (ADC)) as output pixel value. When the current pixel location is a defective pixel location, providing a previous pixel value (e.g., a previous pixel value that is in the same frame, same row, and a predetermined number of pixels from the current pixel locations) as the output pixel value.

BRIEF DESCRIPTION OF THE DRAWINGS

The present invention is illustrated by way of example, and not by way of limitation, in the figures of the accompanying drawings and in which like reference numerals refer to similar elements.

DESCRIPTION OF THE PREFERRED EMBODIMENT

A defective pixel correction method and system for image sensors are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Exemplary Image Sensor 100

Figure 1:
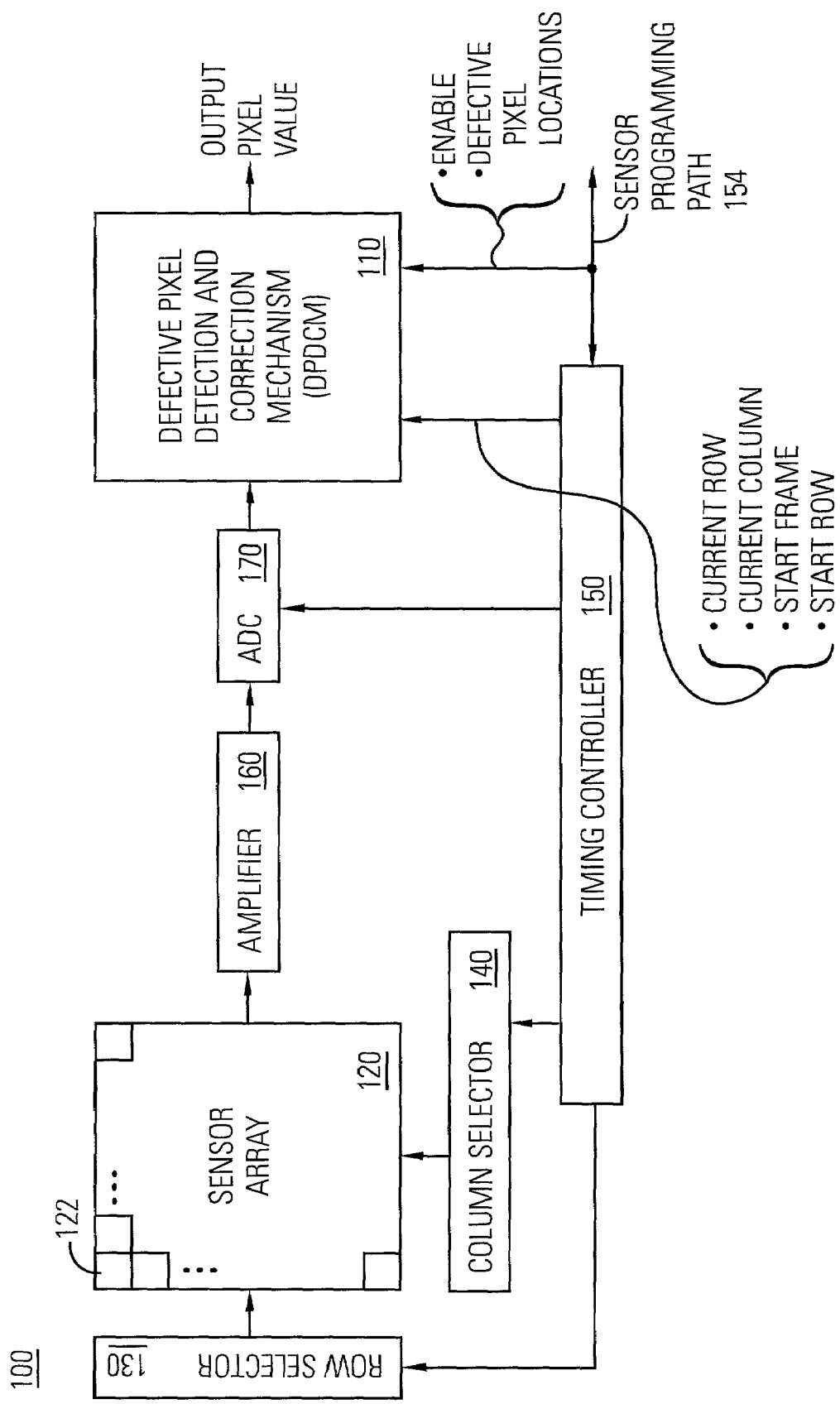
FIG. 1 is a block diagram illustrating an exemplary image sensor in which the defective pixel detection and correction mechanism (DPDCM) of the present invention can be implemented.

FIG. 1 is a block diagram illustrating an exemplary image sensor 100 in which the defective pixel detection and correction mechanism (DPDCM) 110 of the present invention can be implemented. The image sensor 100 includes a sensor array 120 having a plurality of pixels 122 that are arranged in rows and columns. The image sensor 100 also includes row select logic 130 (hereinafter referred to as row selector) for selecting a row of the array 120 and a column select logic 140 (hereinafter referred to as column selector) for selecting a particular column in the array 120. Together, the row selector 130 and the column selector 140 specify a particular pixel in the array 120 for access (e.g. an access to read the value at the pixel).

The image sensor 100 also includes a timing controller 150, whose construction and operation is well known by those of ordinary skill in the art, for providing various control signals to components in the sensor 100. For example, the timing controller 150 provides signals to control the row selector 130 and the column selector 140.

The image sensor 100 also includes an amplifier 160 that is coupled to the output of the sensor array 120 for amplifying the output of the sensor array 120 and an analog to digital converter (ADC) 170 that is coupled to the amplifier 160 for converting the analog pixel values into corresponding digital pixel values. The timing controller 150 also provides signals to control the ADC 170.

The image sensor 100 can include the defective pixel detection and correction mechanism (DPDCM) 110 of the present invention. The defective pixel detection and correction mechanism (DPDCM) 110 detects and corrects of defective pixels in a stable and consistent manner, thereby reducing artifacts that stem from inconsistent detection and correction of defective pixels. The DPDCM 110 employs a look-up table with defective pixel locations for enabling consistent defective pixel detection and a consistent replacement choice facility for enabling stable defective pixel correction. The defective pixel location table and consistent replacement choice facility are described in greater detail hereinafter with reference to FIG. 2.

The DPDCM 110 includes a first input that is coupled to the ADC 170 for receiving the digital value of a current pixel. The DPDCM 110 also includes a plurality of inputs that are coupled to the timing controller 150 for receiving a plurality of signals therefrom. In this embodiment, the plurality of signals includes a start frame signal for indicating the start of a new frame, a start row signal for indicating the start of a new row, a current row signal for indicating a current row, and a current column signal for indicating a current column.

The DPDCM 110 also includes an input that is coupled to a sensor programming path 154. The sensor programming path 154 is provided to allow an external source (e.g., a designer or a component external to the DPDCM 110) to program and control the DPDCM 110. For example, the sensor programming path 154 can be utilized to program the look-up table with defective pixel locations that are determined, for example, by a manufacturing test. The sensor programming path 154 can include an enable signal that can be utilized to enable or disable the DPDCM 110 by selectively asserting or de-asserting the enable signal.

Based on these inputs, the DPDCM 110 determines whether a current pixel location is a defective pixel location. When the current pixel location is not a defective pixel location, the DPDCM 110 provides the pixel value received from the ADC 170 as an output pixel value. When the current pixel location is a defective pixel location, the DPDCM 110 provides a previous pixel value as the output pixel value. For example, the previous pixel value can be in the same frame, on the same row, and a predetermined number of pixels away from the current pixel. Preferably, the previous pixel is of the same color and two pixel locations to the left of the current pixel. The DPDCM 110 is described in greater detail hereinafter with reference to FIG. 2 and FIG. 3.

It is to be appreciated that the image sensor 100 can be implemented as a stand-alone integrated circuit for use with other integrated circuits (e.g., for use in chip set) or incorporated as a functional block in an application specific integrated circuit (ASIC). One aspect of the present invention is an efficient, space-saving, hardware implementation of a defective pixel detection and correction mechanism that obviates the need for processing power (e.g., a processor) required by prior art software techniques. Another advantage of the present invention is that the correction mechanism can be implemented in the sensor chip 100. The pixel correction mechanism of the present invention provides consistent defective pixel detection and consistent defective pixel correction with stable replacement values for the defective pixels.

Defective Pixel Detection and Correction Mechanism (DPDCM)

Figure 2:
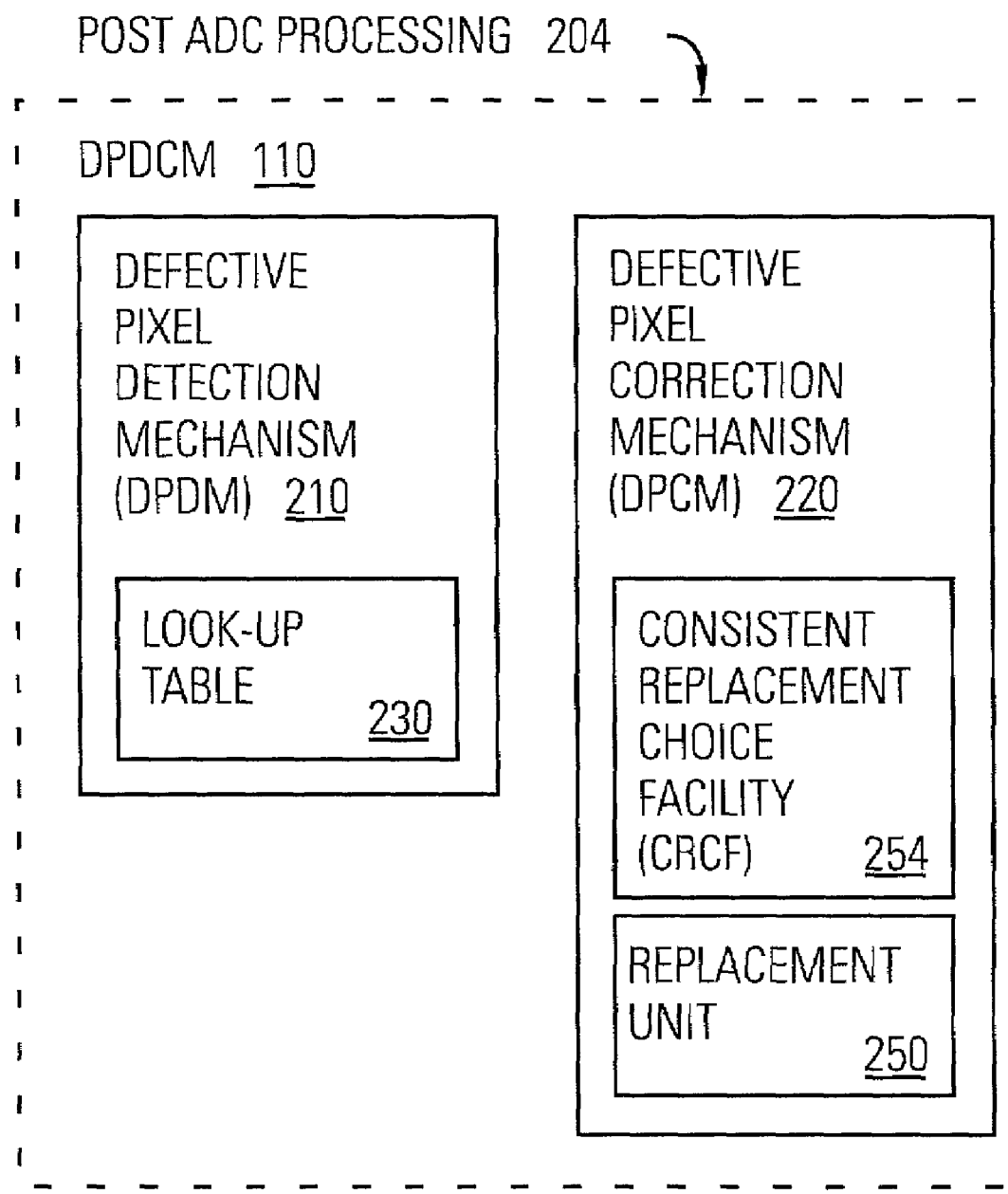
FIG. 2 illustrates in greater detail the defective pixel detection and correction mechanism (DPDCM) of FIG. 1 in accordance with one embodiment of the present invention.

FIG. 2 illustrates in greater detail the defective pixel detection and correction mechanism (DPDCM) 110 of FIG. 1 in accordance with one embodiment of the present invention. It is noted that the DPDCM 110 can be implemented in a post ADC processing block 204 that performs digital signal processing on post ADC digital image data.

The DPDCM 110 includes a defective pixel detection mechanism (DPDM) 210 and a defective pixel correction mechanism (DPCM) 220 for eliminating artifacts that stem from inconsistent detection and artifacts that stem from inconsistent correction of defective pixel. respectively.

The defective pixel detection mechanism (DPDM) 210 provides a determination of whether a current pixel location is a defective pixel location in a manner that does not vary from frame to frame. In the preferred embodiment, the defective pixel detection mechanism 210 employs a look-up table with a plurality of defective pixel locations for enabling the consistent detection of defective pixels.

The defective pixel correction mechanism (DPCM) 220 replaces a current defective pixel with a previous pixel value that is a consistent replacement choice. Preferably, the previous pixel value is from the same frame, on the same row, and a predetermined number of pixels from the current defective pixel location (e.g., two pixels to the left of the current pixel location). The defective pixel correction mechanism employs a consistent replacement choice facility 254 to provide a previous pixel value in the same frame, on the same row, and a predetermined number of pixels from the current pixel location as a replacement pixel value. A replacement unit 250 (e.g., multiplexer) is provided for replacing the defective pixel value with the replacement value.

Figure 3:
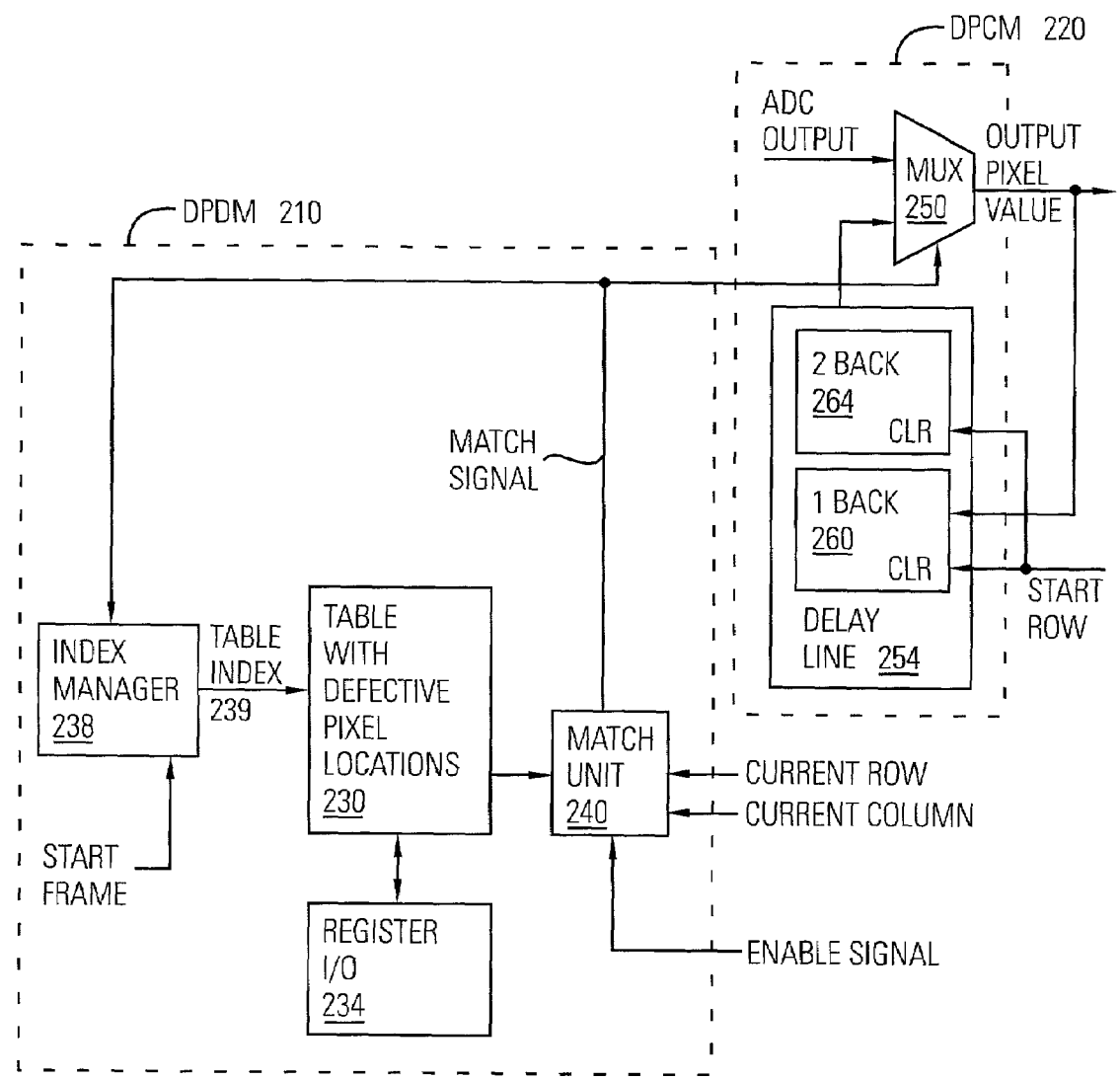
FIG. 3 illustrates in greater detail the defective pixel detection mechanism (DPDM) and the defective pixel correction mechanism (DPCM) of FIG. 2 in accordance with one embodiment of the present invention.

FIG. 3 illustrates in greater detail the defective pixel detection mechanism (DPDM) and the defective pixel correction mechanism (DPCM) of FIG. 2 in accordance with one embodiment of the present invention.

Defective Pixel Detection Mechanism 210

The defective pixel detection mechanism 210 includes a look-up table 230 for storing defective pixel locations, a register 234 for use in accessing (e.g., reading or writing) the defective pixel locations, an index 238 for pointing to a particular defective pixel location in the table 230, and an index manager 242 (e.g., an incrementer) for managing the index 238.

In the preferred embodiment, the defective pixel locations in the lookup table 230 are stored in a sorted order. In this manner, no search of the table is required, thereby saving hardware components and space. Furthermore, the last table entry is preferably coded as a non-existing location (e.g., a location that is off the end of the pixel array). In this manner, the last table entry is guaranteed never to match a current row and current column, and so the index is never incremented beyond the last entry. Consequently, no limit check need be performed on the lookup table index, thereby saving hardware components and space.

These enhancements to the lookup table 230 enable the defective pixel correction mechanism to be implemented in an even more efficient and cost-effective manner. By simplifying the hardware needed to implement the correction mechanism, the amount of physical space occupied is further reduced as compared with prior art approaches.

When the defective pixel locations are stored in a sorted order, the index manager 242 can be implemented with an incrementer that simply updates the index 238 (e.g., incrementing the index by one) whenever there is a match so that the index 238 points to the next defective pixel location in the table 230.

Exemplary Defective Pixel Location Table 230

Figure 5:
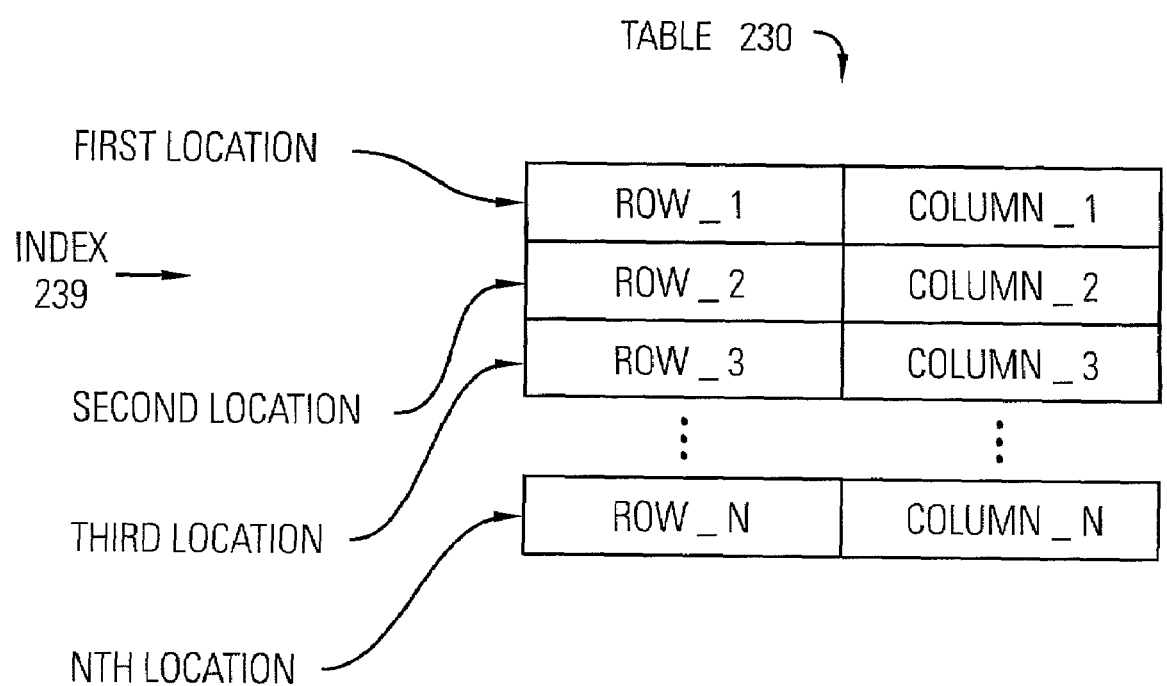
FIG. 5 illustrates an exemplary defective pixel location table.

FIG. 5 illustrates an exemplary configuration for the defective pixel location table 230. The table 230 can include a plurality of defective pixel locations (e.g., a first location, a second location, a third location and an Nth location). Each location can have a row value (e.g., ROW_1, ROW_2, . . . , ROW_N) and column value (e.g., COL_1, COL_2, . . . , COL_N) for specifying a pixel location in the array of pixels that is defective. The index manager 238 is employed to manage a table index 239 that points to one of the defective pixel locations. The index manager 238 has an input for receiving a start frame signal and responsive thereto for resetting the table index so that the index points to the first defective pixel location.

The index manager 238 can manage the index 239, for example, by incrementing the table index every time there is a match between the current pixel location and the current defective pixel location. In this regard, the index manager 238 can employ an incrementer that is responsive to the match signal for selectively updating the index 239 by one.

The defective pixel detection mechanism 210 also includes a match unit 240 that has a first input for receiving the current row and current column, a second input for receiving a next defective pixel location, and a third input for receiving an enable signal. The match unit 240 is provided to determine whether a current row and current column match with a row and column, respectively, that are specified by a defective pixel location. When the match unit 240 determines that a match has occurred, the match unit 240 asserts a match signal.

When the asserted match signal is provided to the replacement unit 250, the replacement unit 250 provides the output of the consistent replacement choice facility 254 as the output pixel value. In other words, the replacement unit 250 replaces the defective pixel value with a consistent replacement choice (e.g., a previous pixel value), which is described in greater detail hereinafter. The asserted match signal is also provided to the index manager 238 to update (e.g., to increment by one) the index 239 so that the index 239 points to the next defective pixel location in the table 230.

It is noted that the match unit 240 is provided with an enable input for receiving an enable signal that can be used by a designer to selectively disable the match unit 240 of the DPDCM 110 of the present invention. When the match unit 240 is disabled, the replacement unit 250 only provides the ADC output as the output pixel value (i.e., the output of the consistent replacement choice facility 254 is never provided as an output pixel value), thereby effectively disabling the DPDCM 110 of the present invention.

Defective Pixel Correction Mechanism 220

In one embodiment, the replacement unit 250 is implemented with a multiplexer 250 that has a first input coupled to the ADC 170 for receiving the output of the ADC 170 and a second input coupled to a consistent replacement choice facility 254, and a third input coupled to the match unit 240. Based on these inputs, the multiplexer 250 selectively outputs either the value provided by the ADC 170 or a previous pixel value provided by the consistent replacement choice facility 254. The replacement value can be, for example, a previous pixel that is in the same frame, in the same row, and that is a predetermined number of pixels from the current pixel (e.g., two pixels to the left of the current pixel location).

The consistent replacement choice facility 254 can be implemented with a delay line having a one-back circuit 260 coupled to a two-back circuit 264. Upon receipt of a start row signal, the one-back circuit 260 and the two-back circuit 264 are cleared. Thereafter, the current (N) output pixel value is provided to the one-back circuit 260 when the N+1 (next) pixel is being processed by the DPDCM 110 and then moved to the two-back circuit 264 when the N+2 pixel is processed by the DPDCM 110. The value in the two-back circuit 264 is then provided as one of the inputs to the multiplixer 250. When the match signal is asserted, the multiplexer outputs the replacement value (i.e., the output of the two-back circuit 264) instead of the output of the ADC 170. When the match signal is de-asserted (i.e., the current pixel is not a defective pixel location), the digital pixel value of the current pixel is provided as the output of the multiplexer 250. When a color filter with Bayer pattern is employed, the two step delay line provides a previous pixel value having the same color as the current pixel that is two pixels to the left of the current pixel location.

When either the first pixel location or the second pixel location is any of the rows is a defective pixel location, the output pixel value is assigned a zero value since two pixels need to be processed for each row before the output pixel value propagates to the output of the two-back circuit 264.

Defective Pixel Processing

Figure 4:
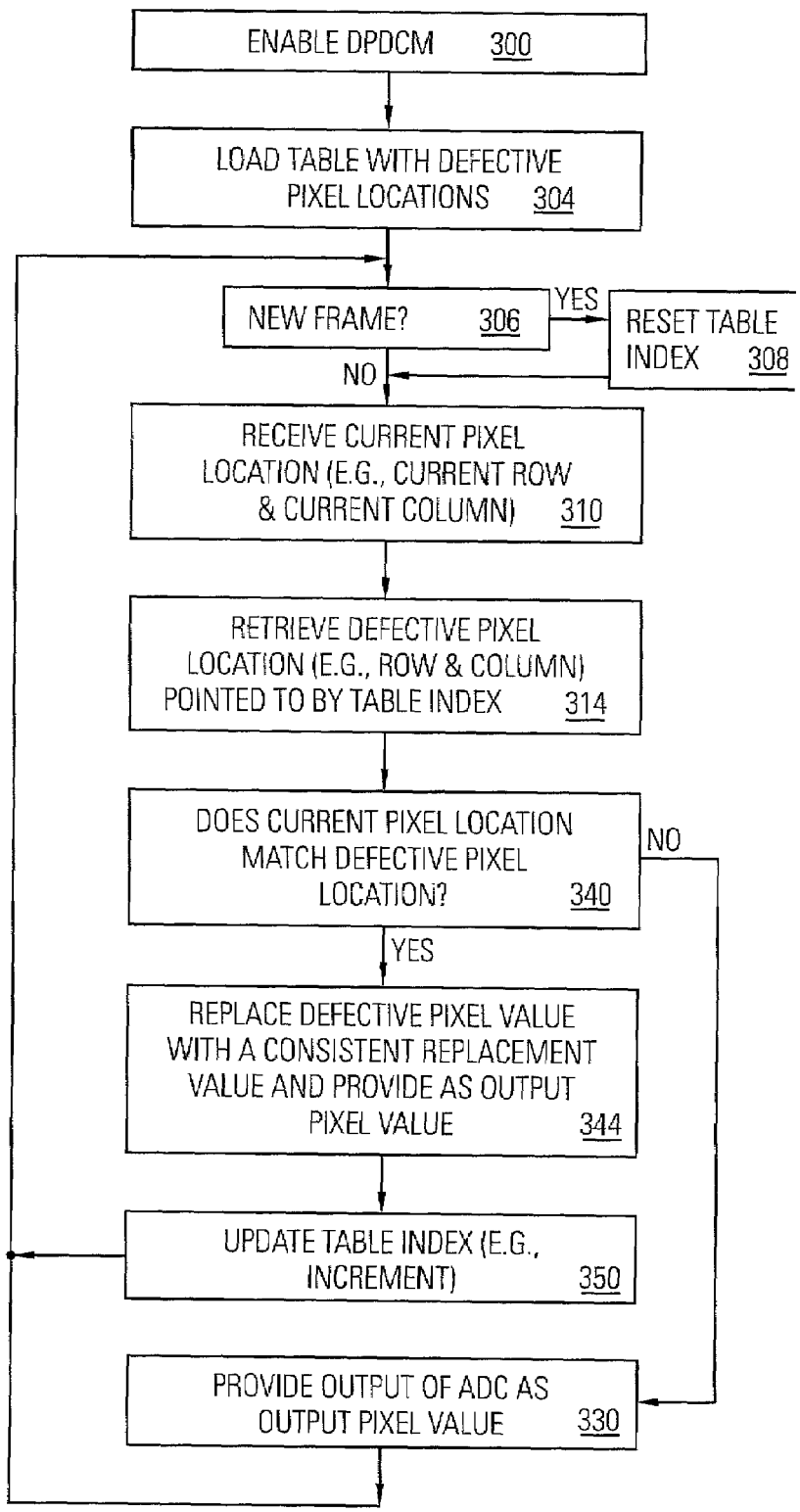
FIG. 4 is a flowchart illustrating the processing steps performed by the defective pixel detection and correction mechanism (DPDCM) of FIG. 2.

FIG. 4 is a flowchart illustrating the processing steps performed by the defective pixel detection and correction mechanism (DPDCM) 110 of FIG. 2. In step 300, the DPDCM 110 is enabled. For example, an enable signal can be utilized to selectively enable or disable the defective pixel detection and correction mechanism 110. In step 304, a plurality of defective pixel locations is loaded into the look-up table 230. For example, the input/output register 234 can be employed to write defective pixel locations to the look-up table 230.

The step of loading the defective pixel locations can include the step of determining the defective pixel locations through a test (e.g., a manufacturing test). When the lookup table 230 is a read-only type of storage (e.g., a PROM), then the table is programmed during and/or after package test when the defective pixels are identified.

When the lookup table 230 is a random access type of storage (e.g., RAM), then the system in which the sensor is embedded identifies the defective pixels and writes the appropriate values into the RAM during system run-time. Loading the defective pixel locations can be a configuration step, an initial run time step, or a continuous process.

In decision block 306, a determination is made whether a new frame signal has been asserted. When a new frame signal has been asserted, the table index is reset in step 308. Thereafter, processing continues at step 310. When a new frame signal has not been asserted, processing proceeds to step 310.

In step 310, the current pixel location (e.g., the current row and current column) are received. In step 314, a defective pixel location pointed to by the table index is received. For example, a row and column corresponding to a defective pixel location pointed to by the index is accessed.

In decision block 340, a determination is made whether the current pixel location matches with the defective pixel location. For example, this step can involve 1) comparing the current row with the row of the defective pixel location (hereinafter referred to also as defective pixel row); 2) comparing the current column with the row of the column of the defective pixel location (hereinafter referred to also as defective pixel column); 3) determining whether there is a match between the current row and the defective pixel row; and 4) determining whether there is a match between the current column and the defective pixel column. As described earlier, the defective pixel locations can be stored in the look-up table 230 in a first order (e.g., a sorted order). Each defective pixel location can specify a row and column where a defective pixel may be found.

Step 340 can include the step of asserting a match signal when there is a match and de-asserting the match signal when there is no match. The match signal can then be utilized to control the MUX 250 to selectively provide either the output of the ADC 170 or to provide a replacement value (e.g., the output of the two-back circuit 264) as the output pixel value.

When there is no match, processing continues at step 330, where the output of the ADC 170 is provided as the output pixel value. In this case, a current pixel location is not a defective pixel location. It is noted that the detection of defective pixels is stable and consistent from frame to frame (i.e., the defective pixel locations are predetermined and do not vary from frame to frame). Consequently, the consistent defective pixel detection mechanism of the present invention reduces or eliminates artifacts that stem from an inconsistent defective pixel detection scheme. Processing then continues at decision block 306.

When there is a match, in step 344 a previous pixel value is provided as the output pixel value. Preferably, the previous pixel value is in the same frame, in the same row, and two pixels to the left from the current pixel location. In this case, a current pixel location is a defective pixel location. It is noted that the correction of defective pixels is stable and consistent from frame to frame (i.e., a previous pixel value is chosen that is a predetermined or a fixed number of pixels from the current pixel location to replace the defective pixel). Consequently, the consistent defective pixel correction mechanism of the present invention reduces or eliminates the artifacts that stem from an inconsistent defective pixel correction scheme.

In step 350, an index into the table of defective pixel locations is incremented so that the index points to the next defective pixel location. Processing then continues at decision block 306.

The defective pixel detection and correction technique of the present invention also effectively handles the case of multiple adjacent defective pixels. The de-mosaicing process tends to smooth out the effects of adjacent pixels being set to previous pixels (e.g., two pixels to the left of the current pixel location). The de-mosaicing process examines surrounding pixels to estimate the color values of each given pixel. For example, when a defective red pixel is set to a value of a previous red pixel two places to the left of the current pixel, the blue and green values for the current pixel location are interpolated with neighbors of the current pixel location and not the neighbors of the previous pixel, thereby tending to smooth out the effects of the pixel correction. Consequently, the defective pixel detection and correction technique of the present invention allows sensors with clusters of adjacent defective pixels to be hidden from the system.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for correcting at least one defective pixel in an array of pixels having a first predetermined number of rows and a second predetermined number of columns comprising:
   receiving a current pixel location;
   receiving a defective pixel location that does not vary from frame to frame;
   wherein receiving a defective pixel location includes:
   employing a table for storing a plurality of defective pixel locations; wherein the table includes a last entry having a row value and a column value; wherein employing a table for storing a plurality of defective pixel locations includes:
      setting the row value of the last entry in the table to a value that is greater than the first predetermined number of rows; and
      selling the column value of the last entry in the table to a value that is greater than the second predetermined number of columns;
   when the current pixel location is not a defective pixel location, providing a received pixel value as output pixel value; and
   when the current pixel location is a defective pixel location, providing a consistent replacement pixel value as the output pixel value.

2. The method of claim 1, wherein the current pixel location includes a current row and a current column; wherein the defective pixel location includes a defective pixel row and a defective pixel column; wherein the step of determining whether the current pixel location is a defective pixel location further comprises:
   comparing the current row with the defective pixel row and comparing the current column with the defective pixel column;
   determining whether there is a match between the current row and the defective pixel row; and
   determining whether there is a match between the current column and the defective pixel column.

3. The method of claim 1, wherein the step of when the current pixel location is not a defective pixel location, providing a received pixel value as an output pixel value further comprises:
   receiving a pixel value from an analog to digital converter; and
   providing the received pixel value as an output pixel value.

4. The method of claim 1, wherein the step of when the current pixel location is a defective pixel location, providing a consistent replacement pixel value as the output pixel value further comprises:
   providing a consistent replacement pixel value that is in the same frame, in the same row, and a predetermined number of pixels from the current pixel location as the output pixel value.

5. The method of claim 4 wherein the step of providing a previous pixel value that is in the same frame, in the same row, and a predetermined number of pixels from the current pixel location as the output pixel value further comprises:
   providing a previous pixel value that has the same color as the current pixel and Is two pixels to the left of the current pixel location as the output pixel value.

6. The method of claim 1, wherein the step of when the current pixel location is a defective pixel location, providing a consistent replacement pixel value as the output pixel value further comprises:
   when the current pixel location is one of the first pixel location and the second pixel location of a row, providing a zero pixel value as the output pixel value.

7. The method of claim 1, wherein the step of when the current pixel location is a defective pixel location, providing a consistent replacement pixel value as the output pixel value further comprises:
   employing a two step delay circuit to provide a replacement pixel value for the defective current pixel:
   wherein the two step delay circuit is reset to zero at the beginning of every row.

8. The method of claim 1, wherein the method eliminates one of artifacts that stem from inconsistent detection of defective pixels from frame to frame and artifacts that stem from inconsistent replacement of defective pixels.

9. The method of claim 1, wherein the defective pixel locations are stored in the table in a sorted order; wherein a search of the table to determine if a current pixel location is a detective location is obviated.

10. A circuit for correcting defective pixels in an array having a plurality of pixels comprising:
   a defective pixel detection mechanism for providing a determination of whether a pixel is defective, the defective pixel detection mechanism having a table for storing a plurality of defective pixel locations that do not vary from frame to frame; wherein the table has a plurality of entries, each entry having a row value and a column value, the plurality of entries including a last entry; wherein the row value of the last entry in the table is set to a value that Is greater than the first predetermined number of rows; and the column value of the last entry in the table Is set to a value that Is greater than the second predetermined number of columns; wherein hardware to determine if the last entry in the table has been reached is obviated; and a defective pixel correction mechanism that replaces a current defective pixel with a consistent replacement pixel value from the same frame, on the same row, and a predetermined number of pixels from the current defective pixel;

wherein the defective pixel correction mechanism and the defective pixel detection mechanism eliminate one of artifacts that stem from inconsistent detection of defective pixel from frame to frame and artifacts that stem from inconsistent replacement of defective pixels.

11. The circuit of claim 10, wherein the defective pixel detection mechanism includes:

a match unit for receiving a current pixel location and a defective pixel location, comparing a current pixel location with a defective pixel location, asserting a match signal when there is a match, and de-asserting the match signal when there is no match.

12. The circuit of claim 11, wherein the defective pixel detection mechanism further includes:

an index manager coupled to the table and the match unit for receiving the match signal and responsive thereto for managing a table index that points to a current defective pixel location in the table.

13. The circuit of claim 12, wherein the index manager, responsive to an asserted match signal, increments the table Index so that the table index points to the next defective pixel location; and wherein the index manager has an input for receiving a start frame signal and responsive thereto for resetting the table index.

14. The circuit of claim 10, wherein the defective pixel detection mechanism includes:

a register coupled to the table for use in writing defective pixer locations to the table and reading defective pixel locations from the table.

15. The circuit of claim 11, wherein the defective pixel correction mechanism further includes:

a consistent replacement choice facility for generating a first output; a source for providing a second output; and a replacement unit coupled to the consistent replacement choice facility for receiving the first output, to the source for receiving the second output, and to the match unit for receiving the match signal; the replacement unit for selectively providing a first output and a second output as an output pixel value based on the match signal.

16. The circuit of claim 15, wherein the replacement unit includes a multiplexer; and wherein the a consistent replacement choice facility Includes a two step delay line having a one back circuit and a two back circuit for providing the first output to the multiplexer;

wherein the one back circuit and a two back circuit each includes an Input for receiving a start row signal and responsive thereto for clearing the contents thereof.

17. The circuit of claim 11, wherein the source for providing a second output includes:

an analog to digital converter for providing a current pixel value as the second output.

18. The circuit of claim 10, wherein the circuit is couplable to an array of pixels having a first predetermined number of rows and a second predetermined number of columns;

wherein the table includes a plurality of defective pixel locations that are in a sorted order; wherein a search of the table to determine if a current pixel location is a defective pixel location is obviated.

19. An image sensor comprising:

(a) a sensor array having a plurality of pixels arranged in rows and columns; wherein at least one pixel is defective;

(b) a row selector coupled to the sensor array for selecting a row of the sensor array;

(c) a column selector coupled to the sensor array for selecting a column of the sensor array;

(d) a timing controller coupled to the row selector and column selector for providing control signals thereto;

(e) a defective pixel detection mechanism that employs a look-up table with defective pixel locations for providing a determination of whether a pixel is defective or non-defective; wherein the defective pixel locations do not vary from frame to frame; wherein the table has a plurality of entries, each entry having a row value and a column value, the plurality of entries including a last entry; wherein the row value of the last entry in the table is set to a value that is greater than the first predetermined number of rows; and the column value of the last entry in the table is set to a value that is greater than the second predetermined number of columns; wherein hardware to determine If the last entry in the table has been reached is obviated; and f) a defective pixel correction mechanism coupled to the defective pixel detection mechanism that employs a consistent replacement choice facility for providing a consistent replacement pixel value in the same frame, on the same row, and a predetermined number of pixels from the current pixel location, and a replacement unit for replacing the defective pixel value with the consistent replacement pixel value.

* * * * *

UNITED STATES PATENT AND TRADEMARK OFFICE
CERTIFICATE OF CORRECTION

| | | |
|---|---|---|
| PATENT NO. | : 7,209,168 B2 | Page 1 of 1 |
| APPLICATION NO. | : 09/834061 | |
| DATED | : April 11, 2001 | |
| INVENTOR(S) | : William L. Post | |

It is certified that error appears in the above-identified patent and that said Letters Patent is hereby corrected as shown below:

Column 9, claim 1, line 49, delete "selling" and insert -- setting --.
Column 10, claim 9, line 50, delete "detective" and insert -- defective --.

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,209,168 B2 |
| APPLICATION NO. | : 09/834061 |
| DATED | : April 24, 2007 |
| INVENTOR(S) | : William L. Post |

It is certified that error appears in the above-identified patent and that said Letters Patent is hereby corrected as shown below:

Column 9, claim 1, line 49, delete "selling" and insert -- setting --.
Column 10, claim 9, line 50, delete "detective" and insert -- defective --.

This certificate supersedes Certificate of Correction issued August 7, 2007.

Signed and Sealed this

Twenty-eighth Day of August, 2007

JON W. DUDAS
*Director of the United States Patent and Trademark Office*